Jan. 21, 1930.  S. COHEN  1,744,527
TRAILER
Original Filed April 27, 1928    2 Sheets-Sheet 1
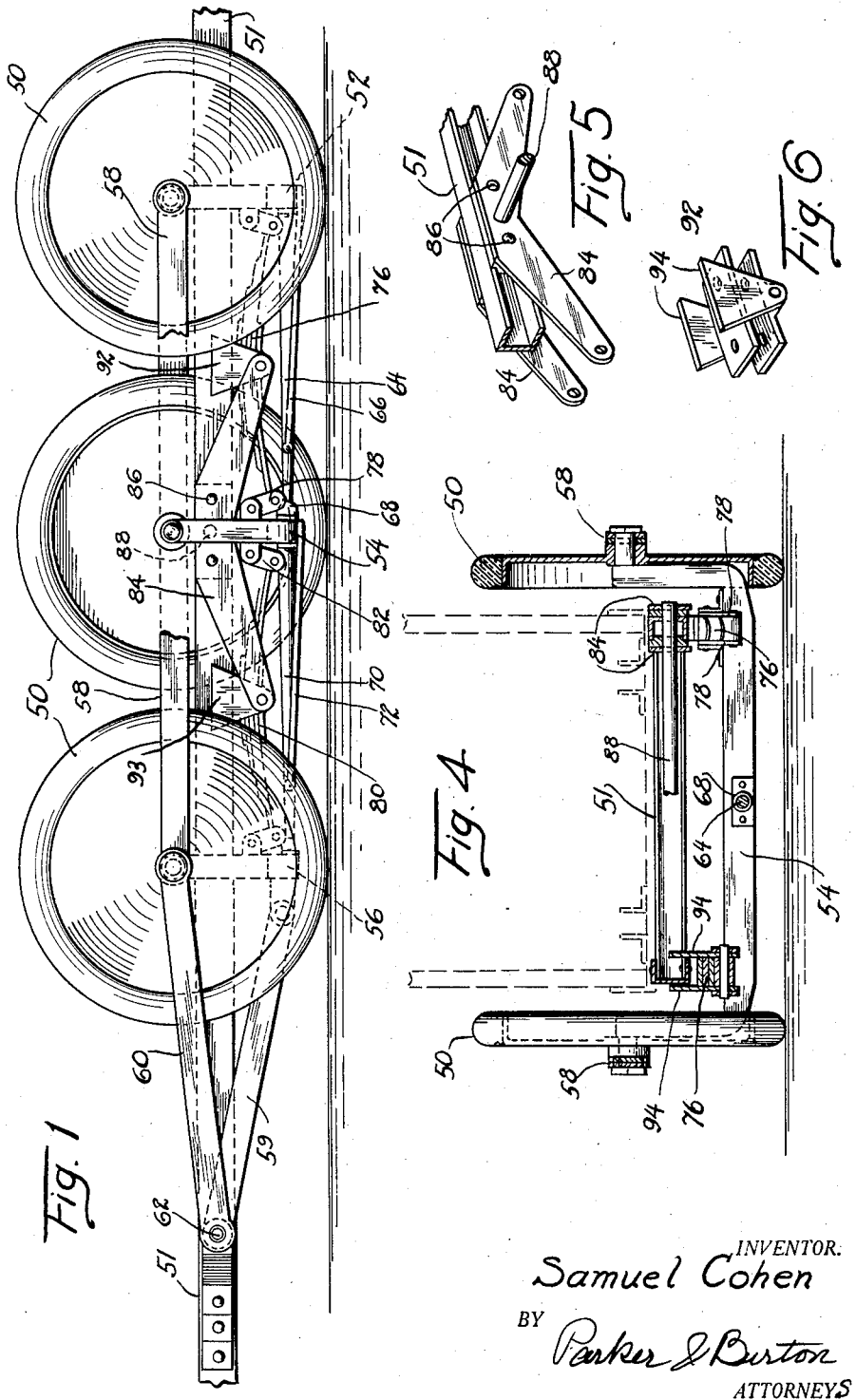
INVENTOR.
Samuel Cohen
BY
Parker & Burton
ATTORNEYS Jan. 21, 1930.  S. COHEN  1,744,527
TRAILER
Original Filed April 27, 1928   2 Sheets-Sheet 2
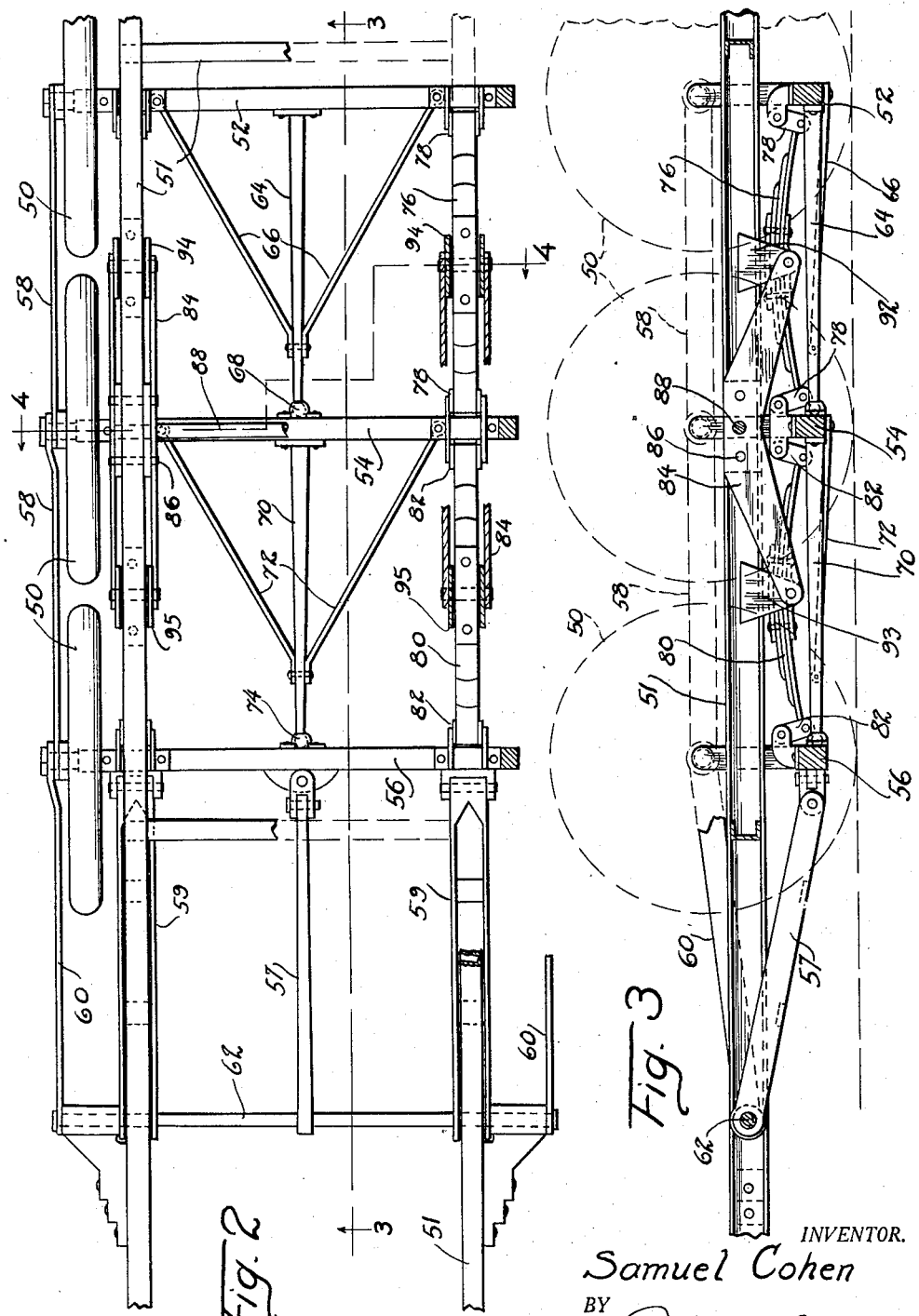
INVENTOR.
Samuel Cohen
BY
ATTORNEYS Patented Jan. 21, 1930

1,744,527

UNITED STATES PATENT OFFICE

SAMUEL COHEN, OF DETROIT, MICHIGAN

TRAILER

Original application filed April 27, 1928, Serial No. 273,188. Divided and this application filed June 10, 1929. Serial No. 369,535.

My invention relates to improvements in trailers and particularly to the mounting of the trailer frame upon its supporting wheel trucks and also particularly to that type of trailer adapted for use in the transporting of motor vehicles carried in the body thereof so that a trailer of considerable size and strength is provided.

The inventive concept here claimed is embodied in a novel manner of mounting or securing the trailer frame to a multiple wheel supporting truck and wherein the center of gravity is kept low. The trailer frame is amply supported for the carrying of a large load and the connection between the trailer frame and the truck frame is such as to distribute the load and the torque in a manner best suited to meet the demands of a vehicle of this type to facilitate easy travel of the vehicle over the road.

Other objects, advantages and meritorious features of my invention will more fully appear from the following specification, appended claims and accompanying drawings, wherein,—

Fig. 1 is a side elevation of my wheel truck frame and its mounting on the trailer frame.

Fig. 2 is a plan of the structure shown in Fig. 1.

Fig. 3 is a cross-sectional view taken on line 3—3 of Fig. 2.

Fig. 4 is a cross-sectional view taken on line 4—4 of Fig. 2.

Fig. 5 is a perspective of one of the frame supporting brackets.

Fig. 6 is a perspective of one of the spring clip members carried by the frame supporting bracket.

This application is a division of my application, Ser. No. 273,188, filed April 27, 1928. The general arrangement and construction of the trailer assembly is shown and claimed in the earlier application.

The main frame of the trailer 51 is supported upon wheel trucks, here shown as including three pairs of road wheels 50 mounted upon drop center axles. There is shown a rear axle 52, an intermediate axle 54, and a forward axle 56, upon the ends of which the road wheels 50 are mounted. The ends of the axles beyond the road wheels are connected by torque members 58 and the ends of the forward axle beyond the road wheels are connected by upwardly extending torque members 60 to the trailer frame, being secured thereto upon a transverse supporting shaft 62.

The intermediate drop center sections of the axles are also connected by torque members through a novel arrangement here provided. The rear axle 52 is connected by a torque member 64, braced from the rear axle by struts 66, with the intermediate axle 54 through a universal connection 68. A torque member 70 extends forwardly from the center of the intermediate axle 54, being braced therefrom by struts 72 to the forward axle 56 and is connected therewith by a universal joint 74. The center of the forward axle 56 is connected to the transverse shaft 62 by a torque member 57, and the axle inside of the wheels at each end is connected by torque members 59 which are pivoted on cross shaft 62 on opposite sides of the frame member.

The main frame of the trailer is supported upon this six wheel truck by two pairs of springs. A pair of springs 76 connect the rear axle with the intermediate axle being secured to the drop centers thereof by shackles 78. A pair of springs 80 connect the intermediate axle with the forward axle being secured to the drop centers thereof by shackles 82.

The frame of the trailer is supported upon these trucks through the employment of a pair of brackets, one secured to each side frame member 51, intermediate the ends of the brackets and substantially above the intermediate drop center axle 54. Each bracket comprises a pair of complementary side members 84 secured to opposite sides of the side frame member 51 by suitable means such as bolts 86 and a transverse cross shaft 88 to securely mount the brackets upon the side frame members to extend downwardly in opposite directions from the mounting as shown. The rear end of each bracket is secured to the center of its spring 76 by a spring clip assembly 92 which includes a pair of upright guide plates 94 arranged upon opposite sides of the spring and adapted to extend upwardly on opposite sides of the frame member 51. The forward end of each bracket is secured to the center of its spring 80 by a similar spring clip assembly 93 which likewise includes a pair of guide plates 95 similarly arranged.

What I claim is:

1. A trailer having a frame supported upon a wheel truck comprising three pairs of road wheels mounted upon drop center axles, said frame swung within said drop center axles upon a pair of brackets, one secured to each side of the frame above the middle axle and extending in opposite directions therefrom; two pairs of springs, one pair connecting the middle axle with the rear axle and the other pair connecting the middle axle with the forward axle, said springs being shackled at their ends to the axles, means connecting the ends of the brackets with the intermediate sections of the springs, a torque rod secured and braced to the rear axle and universally connected to the intermediate section of the middle axle, a torque rod secured and braced to the middle axle and universally connected to the forward axle intermediate its ends, and a torque rod secured to the forward axle at its rear end and to the frame at the front end.

2. A trailer having a frame supported upon a wheel truck comprising three pairs of road wheels mounted upon drop center axles, said frame swung within said axles upon two pairs of springs, one pair connecting the middle axle with the rear axle and the other pair connecting the middle axle with the forward axle, a torque connection between each end of the forward axle and the frame and between the forward axle intermediate its ends and the frame, a torque connection between each end of the middle axle and the forward axle and between the middle axle intermediate its ends and the forward axle, and a torque connection between each end of the rear axle and the middle axle and between the rear axle intermediate its ends and the middle axle.

3. A trailer having a frame supported upon a wheel truck comprising three pairs of road wheels mounted upon drop center axles, said frame swung within the drop centers of said axles below their ends upon two pairs of springs, one pair connecting the middle axle with the rear axle and the other pair connecting the middle axle with the forward axle, torque connections between the ends of the axles above the frame, torque connections between the drop centers of the axles below the frame, torque connections extending downwardly from the ends of the forward axle to the frame, and a torque connection extending upwardly from the drop center of the forward axle to the frame.

4. A trailer having a frame supported upon a wheel truck having three pairs of road wheels mounted upon the ends of three drop center axles, means supporting the frame within the drop centers of said axles below the ends thereof including a pair of springs connecting the intermediate axle to the forward axle and a pair of springs connecting the intermediate axle to the rear axle, a pair of brackets one secured to each of said frame members above the intermediate axle and extending downwardly from such point of attachment in opposite directions towards the front axle and the rear axle and secured at each end to the intermediate section of the adjacent spring.

In testimony whereof, I, SAMUEL COHEN, sign this specification.

SAMUEL COHEN.